United States Patent [19]

Tanuma et al.

[11] Patent Number: 4,631,457
[45] Date of Patent: Dec. 23, 1986

[54] METHOD OF LEADING A MOVING BODY DRIVEN BY A DIRECT CURRENT BRUSHLESS MOTOR TO A STARTING POSITION

[75] Inventors: Jiro Tanuma; Takao Uchida; Kunihal Hayashi, all of Tokyo, Japan

[73] Assignee: Oki Electric Industry Co., Ltd., Tokyo, Japan

[21] Appl. No.: 666,047

[22] Filed: Oct. 29, 1984

[30] Foreign Application Priority Data

Nov. 1, 1983 [JP] Japan ................... 58-203626

[51] Int. Cl.[4] ................... H02P 6/02; H02K 29/12
[52] U.S. Cl. ................... 318/254; 318/265; 318/467
[58] Field of Search ................... 318/138, 254 A, 254, 318/256, 257, 264, 265, 293, 439, 467, 603

[56] References Cited

U.S. PATENT DOCUMENTS 4,401,930 8/1983 Kato et al. ................... 318/467 X

FOREIGN PATENT DOCUMENTS

| 2454722 | 12/1980 | France | 318/254 |
| 57-22397 | 2/1982 | Japan | 318/254 |
| 57-40357 | 3/1982 | Japan | 318/254 |
| 58-36195 | 3/1983 | Japan | 318/254 |

OTHER PUBLICATIONS

R. A. Phillips et al, "Stepper Motor Control", IBM Technical Disclosure Bulletin, vol. 12, No. 4, Sep. 1969, p. 584.

Primary Examiner—William M. Shoop, Jr.
Assistant Examiner—Bentsu Ro
Attorney, Agent, or Firm—Peter L. Berger

[57] ABSTRACT

The present invention relates to a method of leading a moving body, such as a print head carrier of a printer of the like, which is driven by a direct current brushless motor, to a starting position. The direct current brushless motor, which forms part of the present invention, includes a stator including a plurality of armature coils secured on a stator yoke through a substrate, a disk-like magnet having N and S poles arranged alternately in the circumferential direction, the magnet being arranged to confront the armature coils, and a rotatable rotor provided with a speed-detecting slit arranged outside the magnet. Rotating power is obtained by applying an electric current corresponding to the magnetic pole of the magnet to each armature coil. A speed detector detects the speed-detecting slit and puts out a frequency pulse voltage proportional to the speed and a counter counts the output pulses from the speed detector to count out the timing to change the excitation phases to the armature coils so as to continuously rotate the rotor. The method of the present invention is characterized in that a stopper to stop the motion of the moving body is arranged so that at a position of a maximum torque of the direct current brushless motor or a predetermined position close to the maximum torque position, the moving body impinges against the stopper to stop rotation of the rotor, the count number in the counter is reset and the motor is then driven in the reverse direction to lead and locate the moving body at a starting position.

3 Claims, 14 Drawing Figures

FIG. 1(III)

METHOD OF LEADING A MOVING BODY DRIVEN BY A DIRECT CURRENT BRUSHLESS MOTOR TO A STARTING POSITION

BACKGROUND OF THE INVENTION (A) Field of the Invention

The present invention relates to a method for leading a moving body, such as a print head carrier of a printer, driven by a direct current brushless motor, to a predetermined starting position, such as a predetermined right or left margin for printing.

(B) Conventional Techniques

Figure 1:
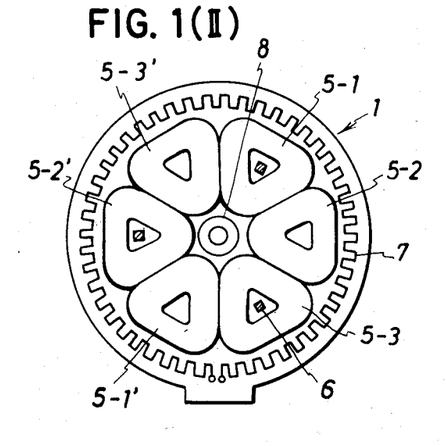

The structure of a conventional three-phase direct current brushless motor of this type with position detecting elements, is illustrated in FIGS. 1-(I) through 1-(IV). In the drawings, reference numeral 1 represents a stator. A substrate 4 is arranged on a stator yoke 2 formed of a magnetic material through an insulating plate 3 and a plurality of armature coils 5 are mounted on the substrate 4. Hall elements 6 are arranged in the central portions of predetermined armature coils 5, and a speed-detecting pattern 7 (Hereinafter referred to as "FG pattern") is formed on the substrate 4 to surround the armature coils 5.

As shown in FIG. 1-(IV), the armature coils 5 include six coils 5-1, 5-2, 5-3, 5-1', 5-2' and 5-3' arranged in a circle, and they are connected in three phases ($\phi 1$, $\phi 2$ and $\phi 3$), as shown in FIG. 1-(IV). Three Hall elements 6 are connected so that the phases deviate from one another by 120°.

Reference numeral 8 represents a bearing arranged in the central portion of the stator 1 and this bearing 8 rotatably supports a shaft of a rotor described below.

Reference numeral 9 represents a rotor, and as shown in FIG. 1-(III), on a rotor yoke 10 formed of a magnetic material a disk-like magnet 11 having 8 fan-shaped equal N and S poles arranged alternately and an annular magnet 12 having N and S poles arranged alternately at the same pitch as that of the FG pattern 7 are attached. A shaft 13 is arranged in the central portion of the yoke 10. The magnet 11 confronts the armature coils 5 of the stator 1 and the magnet 12 confronts the FG pattern 7. The Hall elements 6, the FG pattern 7 and the magnet 12 are position detecting elements.

Figure 1I:
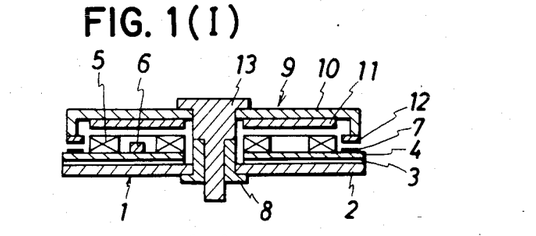

The operation of the above-mentioned conventional motor will now be briefly described. The position of the rotor 9 is detected from the detection outputs of the three hall elements 6, and an electric current at this position is applied to the armature coils 5. The armature coils 5 receive a current force according to Fleming's left-hand law. However, since the armature coils 5 are secured, a reaction force acts on the magnet 11 and the rotor 9 is rotated. When the rotor 9 is rotated, an alternating current is induced in the FG pattern 7 by the annular magnet 12. This alternating current is converted to pulses, and by measuring the pulse width, that is, the frequency of the induced current, acceleration, deceleration and constant speed can be controlled.

As is apparent from the foregoing description, detection of the position and detection of the speed are performed in the conventional direct current brushless motor, and therefore, four kinds of signals are adopted and the number of circuit elements and parts is increased, with the result that deviations are brought about among the hall elements 6 and a problem of an attachment error is caused when the motor is assembled.

Moreover, since the hall elements 6 are arranged in the central portions of the armature coils 5, it is impossible to sufficiently wind coil wires on the inner sides of the armature coils 5, sufficient torque cannot be obtained and the assembling operation becomes complicated.

Figure 2:
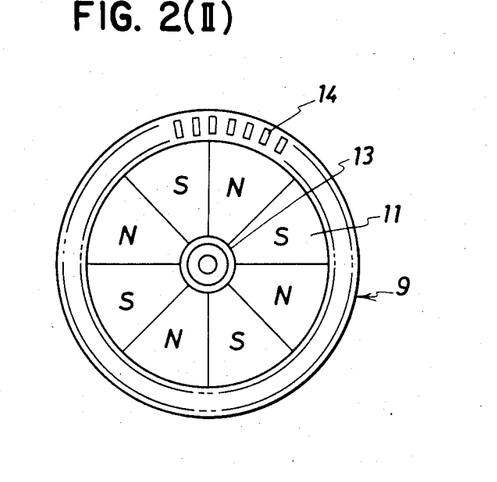

As means for eliminating the foregoing defects, we already proposed in Japanese Patent Application No. 68302/83 a method for driving a direct current brushless motor, in which position-detecting elements are removed and control is performed only by speed-detecting elements, as described hereinafter with reference to FIGS. 2 through 6. The structure of the direct current brushless motor without position detecting elements, is shown in FIG. 2, with which the present invention can be used. The direct current brushless motor shown in FIG. 2 is a three-phase motor, the same as the motor of FIG. 1. However, the phase number of three is only used as an example to help understand the construction and operation of the motor.

Figure 2I:
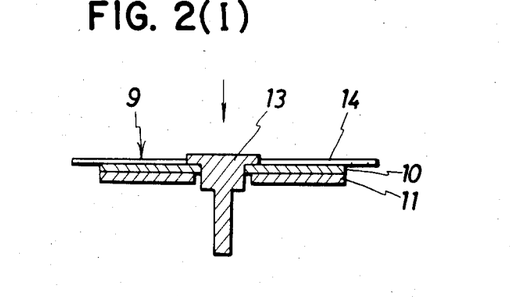

Referring to FIGS. 2-(I) and 2-(II), a rotor 9 comprises a rotor yoke 10, a magnet 11, a shaft 13 and a speed-detecting slit 14. A stator 1 is the same as the stator shown in FIG. 1-(II) except that the hall elements 6 and FG pattern 7 are removed. Accordingly, the stator 1 is not shown in the drawings.

Figure 3:
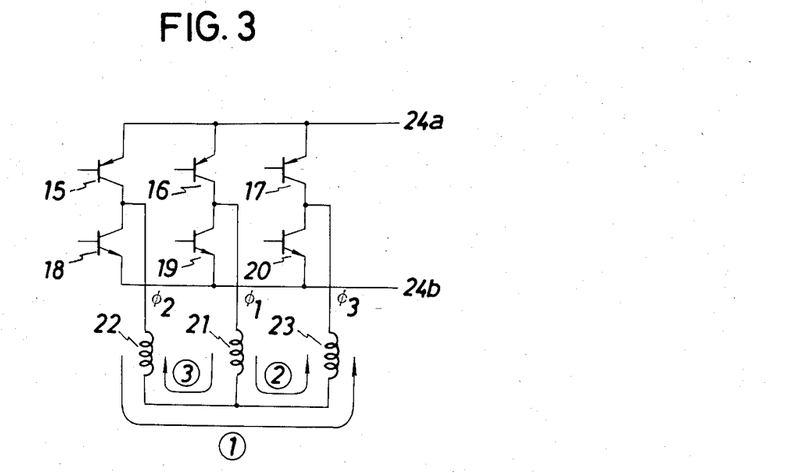
FIG. 3 is a circuit diagram of a 3-phase motor.

FIG. 3 is a simple circuit diagram showing the three-phase motor of FIG. 2. In FIG. 3, reference numerals 15 through 20 represent transistors and reference numerals 21 through 23 represent armature coils. The armature coil 21 corresponds to the armature coils 5-1 and 5-1' in FIG. 1, the armature coil 22 corresponds to the armature coils 5-2 and 5-2' in FIG. 1, and the armature coil 23 corresponds to the armature coil 5-3 and 5-3' in FIG. 1. Reference numeral 24a represents a positive terminal of the power source and reference numeral 24b represents a negative terminal of the power source.

In two-phase excitation, the directions of currents applied to the armature coils 21 through 23 are 6 directions, that is, directions ①, ②, and ③ in FIG. 3 and opposite directions ⊖①, ⊖②, and ⊖③. Waveforms of output torques obtained when constant currents of the directions of arrows ①, ②, ③, ⊖①, ⊖② and ⊖③ are applied to the armature coils 21, 22 and 23 are shown in FIG. 4.

Figure 4:
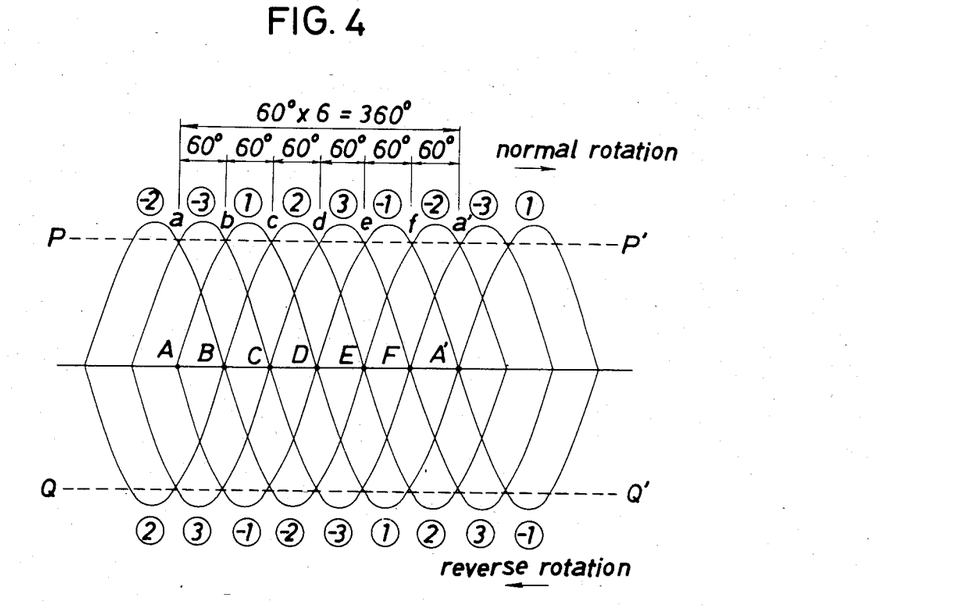
FIG. 4 is a diagram showing the output torque wave form of the 3-phase motor shown in FIG. 3.

In FIG. 4, a, b, c, d, e, f and a' indicate crossing points of the respective output torque waveforms with dotted line P-P', above which the torques for clockwise rotation of lowest ripple can be obtained and A, B, C, D, E, F and A' indicate the positions of the rotor 9 The dot line Q-Q' is the line below which the torques for counterclockwise rotation of lowest ripple can be obtained.

These six waveforms are analogues to one another and deviate from one another by an electric angle of 60°. If the directions of the electric currents are changed by 60°, for example, to the direction ⊖③ at the point a toward the point b, to the direction ① at the point b toward the point c or to the direction ② at the point c toward the point d, a torque of the smallest ripple is obtained above the dotted line P-P' and the rotor 9 is rotated in the normal direction (clockwise rotation seen from the direction of the arrow in FIG. 2-(I)). For the reverse rotation (counterclockwise rotation), the portion below the dotted line Q-Q' is utilized.

When electric currents are changed over by every 60° of the electric angle, changeover is effected 6 times in one cycle (a to a'). Furthermore, this one cycle corresponds to the pitch of the N and S poles of the magnet and, as is seen from FIG. 2-(II), one rotation of the rotor 9 corresponds to 4 cycles. Accordingly, changeover of the electric current should be performed 24 times (=6×4) during one rotation of the rotor 9. Supposing that the speed-detecting slit 14 is divided into 96 segments, during the period of one application of the electric current, for example, between the points a and b, 4 pulses (96÷24) appear, or 8 bit informations of 0 or 1 appear.

At the time of starting the rotation of the motor, the positional relationship of rotor 9 to the armature coils 21, 22 and 23 is somewhere at any one of the stationary points A, B, C, D, E, F and A' in FIG. 4.

As the direct current brushless motor shown in FIG. 2 has no means to detect the position of rotor 9, that is, there are no Hall elements 6, FG pattern 7 or magnet 12 of FIG. 1, it needs to recognize the position of the rotor 9 with respect to a certain position by means of electrical charge and by counting the signals supplied from the speed-detecting elements, so as to detect the position of the rotor 9 relative to such certain position, which will be referred to as the count starting point.

Accordingly, at the time of starting the rotation of the motor without position-detecting elements, there must be a step to lead rotor 9 to the count starting point, each time before a normal rotation starts. Since the electrical charge is restricted to six different types, namely, ①, ②, ③, -①, -②, and -③, in a three-phase motor, the count starting point which can be set by the electrical charge would be one of the above mentioned stationary points A, B, C, D, E, F, A', ... Such count starting point can be set up at any one of these stationary points of rotor 9. Let us describe the process to lead rotor 9, for example, to point E, before normal rotation starts, in order to obtain a count starting point.

First, the electric current in the direction ① is supplied and a sufficient time is allowed to elapse for stopping rotor 9. Since rotor 9 is led to point D from any point by the electric current having the direction ①, such sufficient time is allowed to lead rotor 9 to the stationary state at point D. After rotor 9 reaches the point D, rotor 9 will not move from there, even if electric current in the direction ① is continuously supplied. In this manner, motor 9 can be led to the point D.

Next, electric current in the direction ② is supplied, and sufficient time is allowed to elapse for stopping rotor 9. The electric current in the direction ② leads rotor 9 to the point E from any point. Since rotor 9 has already been led to the point D by the electric current of direction ①, rotor 9 moves from the point D to point E by the electric current of direction ②. Since the point E is the stationary point of the electric current in direction ②, after rotor 9 reaches the point E, rotor 9 will not move from point E, even if the electric current in direction ② is continuously supplied. Therefore, the position of rotor 9 is set at the point E irrespective of the first position of rotor 9 by applying electric current in the order of ①→②.

The direction and order of electric current for setting the count starting point of rotor 9 before a normal rotation, depends upon the starting point chosen. This particular order should be put in the memory of the control portion of the motor in advance.

After the setting of rotor 9 to the count starting point, to drive the motor in the normal direction, the electric current is applied in the order of the directions -①→-②→-③→①→②→③→-① ..., and to drive the motor in the reverse direction, the electric current is applied in the order of the directions -③→-②→-①→③→②→①→-③ ...

From this count starting point, the count of the output pulses from the speed-detecting elements starts to count out the timing to change the excitation phases to the armature coils, so as to continuously rotate rotor 9. The changeover of the electric current direction is fixed to effect every 4 pulses or 8 bits of the output from the speed-detecting elements counted.

Figure 5:
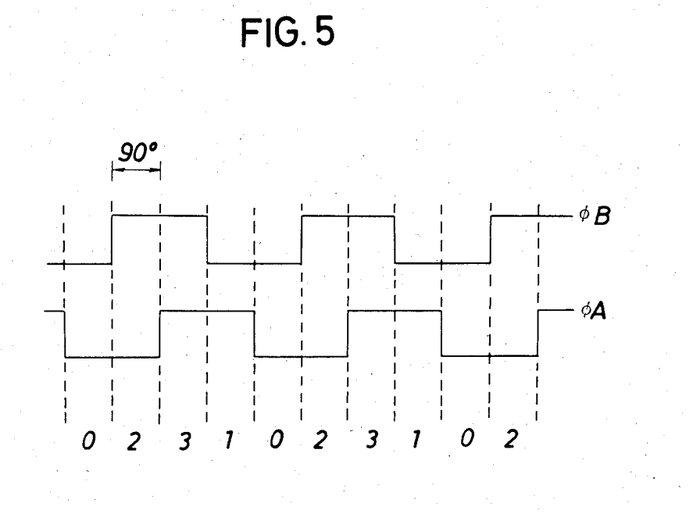
FIG. 5 is a waveform chart illustrating the operation of a speed-detecting slit which is able to judge the direction in the direct current brushless motor shown in FIG. 2.

The following description details the process to detect the position of rotor 9 by counting the output pulses of the speed detecting elements. Conventional speed detector elements are associated with the speed-detecting slit 14 and are deviated from one another by 90° of the electric angle. In this case, detection outputs φA and φB from the speed detector elements are as shown in FIG. 5 and the detector outputs are indicated in a digital manner by values shown in the lower part of FIG. 5 by using the two bits φA and φB (φB=Most Significant Bit, φA=Least Significant Bit) in accordance with the following table.

| φB | φA | Detector Output |
|----|----|-----------------|
| 0  | 0  | 0               |
| 1  | 0  | 2               |
| 0  | 1  | 1               |
| 1  | 1  | 3               |

If the position of the rotor in clockwise rotation is indicated by the change of 0→2→3→1→0 .... in the digital output values from the speed detector elements, the position of rotor 9 in counter-clockwise can be obtained by the change of 0→1→3→2→0 ... Accordingly, if the speed-detecting slit 14 is the same as the slit 14 described above, the change in timing for the electric current is determined by 16 wave form detector output values (=4 pulses×4).

The outputs of the speed detector are counted, an increment is effected in case of the normal rotation direction and when the count number is increased to 16 the number is returned to 0. In case of the reverse rotation direction, decrement is effected and when the count number is reduced to 0, the number is returned to 16.

Following is the process to change the driving direction of the motor of FIG. 2. As an example, suppose that it is desired to change the rotation from the clockwise direction to the counter-clockwise direction at the point F in FIG. 4. In such case, the electric current in the direction ③ which has its stationary point at the point F is supplied.

Thus, this latest electric current in the direction ③ is continuously supplied to rotate the rotor 9 from the point D to the point E, until the rotor 9 stops at point F. In other words, the electric current in the direction -① which would normally be supplied to rotate the rotor 9 from the point E to the point F during normal rotation of rotor 9 in the same direction, is not supplied. Instead, the electric current in the direction ③ which has rotated the rotor 9 from point D to point E is continuously supplied to rotate the rotor 9 from point E to point F. However, information for generating the electric current in the direction ① to start reverse rotation is still prepared corresponding to unused information which would have normally been necessary for supplying the electric current in the direction ⊖① in the normal direction. This latter information is unused, since as aforesaid, the electric current in the direction ③ is used in its place.

The reason for supplying the current ③ in place of the current ⊖① when moving from point E to point F is to stop the rotor at point F, whereupon reverse current can be applied for rotating the rotor at point F in the reverse direction. If the current ⊖① was applied, the rotor would rotate to point F and then move beyond point F to the next point, rather than stopping at point F.

In this manner, the control of the rotation of rotor 9 can be accomplished only by means of the speed detecting elements, whereby the position detecting elements, such as Hall elements 6, FG pattern 7 and magnet 12 can be removed from the components of the motor.

Control of the speed may be performed in the same manner as in the conventional method.

Figure 6:
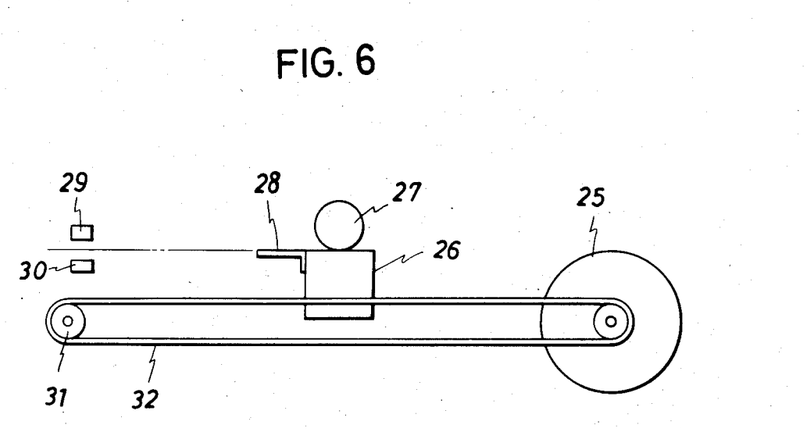
FIG. 6 is a schematic plan view showing an embodiment according to the prior art of a printer which drives its print head carrier by means of the direct current brushless motor of FIG. 2.

FIG. 6 is a schematic plan view showing an embodiment of prior art applied in a printer which drives its print head carrier by means of a direct current brushless motor without the aforementioned position detecting elements, such as Hall elements 6 and the like.

Referring to FIG. 6, reference numeral 25 represents a direct current brushless motor having no hall elements and reference numeral 26 represents a carrier as a moving body. A printing head 27 is loaded on the carrier 26 and a light-intercepting plate 28 is arranged on one side of the carrier 26. Reference numeral 29 represents a light emission diode, reference numeral 30 represents a photo transistor, reference numeral 31 represents a pulley, and reference numeral 32 represents a driving belt wound between the pulley 32 and the direct current brushless motor 25.

The light emission diode 29 and the photo transistor 30 for receiving the light from the light emission diode 29 are arranged on the left end of the moving passage for the carrier 26 so that the diode 29 and photo transistor 30 confront each other. When the direct current brushless motor 25 is driven and the carrier 26 is moved to the left through the driving belt 32, the light-intercepting plate 28 mounted on the carrier 26 intercepts the light from the light emission diode 29.

Figure 7:
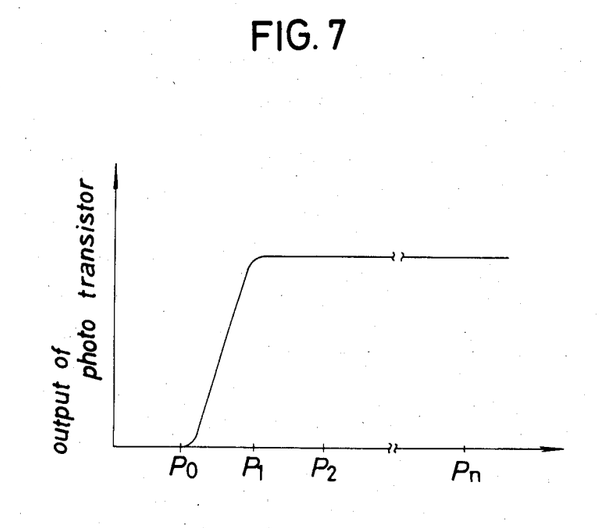
FIG. 7 is a characteristic curve illustrating the relation between the output of a light receiving transistor and a light-intercepting plate in the method shown in FIG. 6.

The relation between the photo transistor 30 and the operation pitch of the carrier 26 is illustrated in FIG. 7, in which the ordinate indicates the output of the photo transistor 30 and stable stop positions $P_0$ through $P_n$ are plotted on the abscissa. As seen from FIG. 7, in the region from $P_n$ to $P_1$, the output of the photo transistor is kept constant, but when the carrier is moved from the point $P_1$ to $P_0$, since the light-intercepting plate 28 intercepts the light from the light transmission diode 29, the output is zero between these points. At this point, the carrier 26 stops at the position of the point $P_0$. Therefore, the point $P_0$ is regarded as the starting position of the carrier 26 (left margin in this case).

In this method, however, since the torque is small in the vicinity of the stop position of the direct current brushless motor 25, it is impossible to stop the rotor 9 precisely at the stop point A, B, C, D, E, F A' . . . against the mechanical friction force. This shear in positioning is left even after positioning of the starting point. Additionally, because of the mechanical friction, not only when leading the carrier 26 to the starting position, but also when leading the rotor 9 to the count starting point before a real rotation of the motor starts, a shear in positioning of the rotor 9 would occur. These shears in positioning cause a deviation of the starting point of the carrier 26 and an occurrence of large torque ripples.

Moreover, since the light emission diode 29 and the photo transistor 30 are used for positioning of the starting point, the output of the photo transistor 30 is readily reduced by dusts or oils and in an extreme case, no output is obtained, resulting in reduction of the reliability. Still further, since the light emission diode and light receiving transistor are used, provision of an amplifier and the like becomes necessary and reduction of the cost is difficult.

SUMMARY OF THE INVENTION

The method of the present invention is characterized in that a stopper to stop the motion of a moving body is arranged at a predetermined position at a maximum torque position or at a position closed to the maximum torque position, so that when the moving body impinges against the stopper and stops the rotation of the rotor, the count value of a counter of the motor for counting output pulses from a speed detector is reset and the motor is driven in the reverse direction to lead and locate the moving body at a predetermined starting position.

It is an object of the invention to provide an improved method for leading a moving body driven by a direct current brushless motor, particularly by a direct current brushless motor controlled without position detecting elements, to a starting position, in which a shear in positioning of the moving body does not occur.

Another object of the invention is to provide an improved method for leading a moving body driven by a direct current brushless motor, particularly by a direct current brushless motor controlled without position detecting elements, to a starting position, in which complex and expensive structure to set a moving body at a predetermined starting position, is eliminated.

A further object of the present invention is to provide a method for leading a moving body driven by a direct current brushless motor to a starting position, in which the direct current brushless motor does not require complex and expensive structure to control its rotation.

BRIEF DESCRIPTION OF THE DRAWINGS

FIG. 1 illustrates the structure of a conventional direct current brushless motor with position detecting elements, in which (I) is a sectional view, (II) is a plane view of a stator, (III) is a plane view of a rotor and (IV) is a wiring diagram of armature coils.

FIG. 2 illustrates the structure of a direct current brushless motor without position detecting elements, with which the present invention can be used, in which (I) is a sectional view of a motor and (II) is a plane view of the rotor.

DETAILED DESCRIPTION OF THE INVENTION

One embodiment of the present invention having the above-mentioned object will now be described in detail with reference to the accompanying drawings.

Figure 8:
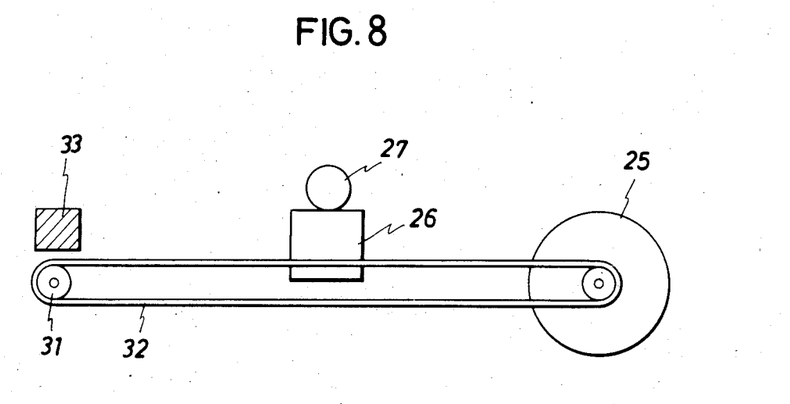
FIG. 8 is a schematic plan view showing an embodiment of the present invention applied in a printer which drives its print head carrier by means of the direct current brushless motor of FIG. 2.

FIG. 8 is a schematic plan view showing an embodiment of the present invention applied in a printer which drives its print head carrier by means of the direct current brushless motor of FIG. 2. In FIG. 8, reference numeral 25 represents a direct current brushless motor according to FIG. 2 which has no position detecting elements, reference numeral 26 represents a carrier, reference numeral 27 represents a printing head, reference numeral 31 represents a pulley and reference numeral 32 represents a driving belt, and these members are the same as those of the printer shown in FIG. 6.

In the present invention, the light-intercepting plate 28, light emission diode 29 and photo transistor 30 shown in FIG. 6, which are used in the conventional method, are not necessary, but a stopper 33 is additionally arranged on the left end of the moving passage of the carrier 26, strictly at the position of ½ pitch of that of the stationary points of rotor 9.

Incidentally, the stopper 33 is arranged as one independent member in this embodiment, but the stopper 33 may be formed integrally with a shaft of the pulley 31 or the like. Further, the position of the stopper is controllable.

Figure 9:
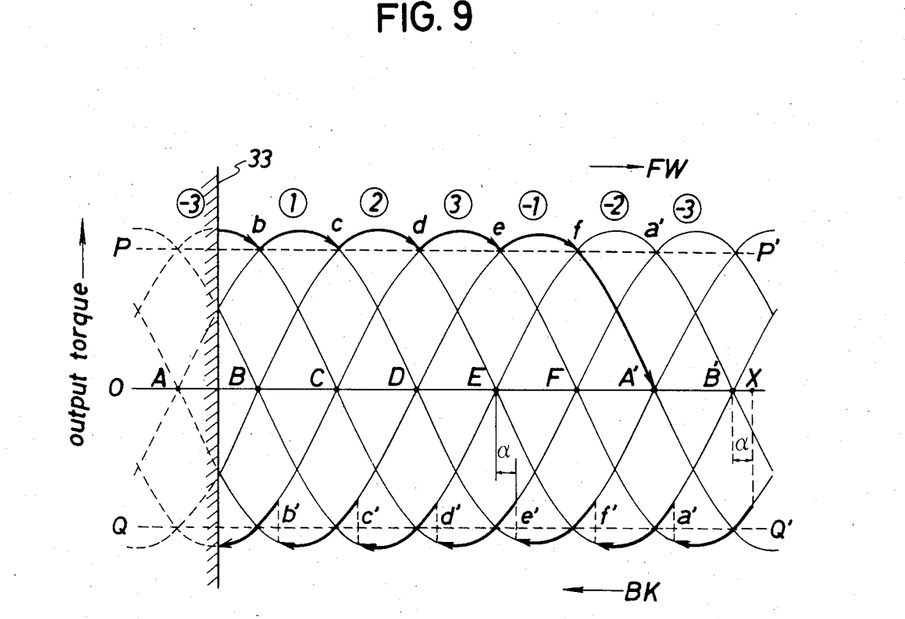
FIG. 9 is a diagram illustrating the output torque wave form and driving state in the present invention.

The operation process of the present invention will now be described with reference to FIGS. 8 and 9. As shown in the drawings, the stopper 33 is set at the position of ½ of the pitch of the stationary points A, B, ..., that is, at the point of the maximum value in the torque wave form. In FIG. 9, the stopper 33 is located at the point of ½ of the pitch A-B on the electric current ⊖③. Of course, the stopper 33 may be set at any of six ½-pitch positions shown in FIG. 9.

Figure 10:
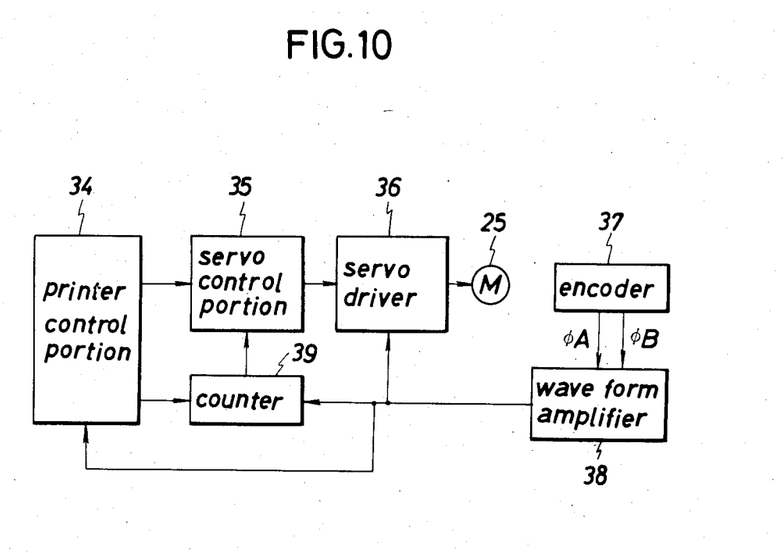
FIG. 10 is a block diagram illustrating the control system of the present invention.

FIG. 10 is a block diagram illustrating the control system of the present invention. A servo control portion 35 forms a phase signal based on a signal from a printer control portion 34 and a signal from a counter 39. A servo driver 36 is driven by this phase signal to cause an electric current to flow in the direct current brushless motor 25. When the rotor 9 of the direct current brushless motor 25 is thus rotated, position signals φA and φB are put out from an encoder 37 and the position signals φA and φB are converted to pulse signals indicating the moving direction in a wave form amplifier 38. These pulse signals are given to the servo driver 36 for the speed control and the counter 39 for the current changeover, respectively.

The counter 39 is an n-coded up-down counter which is turned up on receipt of a pulse signal from a wave shaping circuit 38, for example, a pulse signal in the direction FW in FIG. 9 and turned down on receipt of a pulse signal in the direction BK (n=N/24−1 in which N stands for number of pulses per rotation of the direct current brushless motor). When the value is changed to 0 from n in case of "UP" or when the value is changed to n from 0 in case of "DOWN", the counter 39 gives a changeover signal to the servo control portion 35. Furthermore, the value of the counter 39 may optionally be set in the range of from 0 to n based on signals from the printer control portion 34.

At the time of starting the rotation of the direct current brushless motor 25, the phase is forcibly determined in the servo control portion 35 by the signal from the printer control portion 34. Electric current is caused to flow so that the rotor 9 will be set at the predetermined count starting point, for example, point B′ in FIG. 9, but, because of the mechanical friction the rotor stops at the point X deviated from the point B′ by α in the direction FW. This error α cannot be recognized by the printer control portion 34, because it only recognizes the position of rotor 9 by counting the output pulses of the speed detecting elements, so the value of the counter 39 is reset at 0 as a temporary count starting point, and electric currents are caused to flow in the order of ③→②→① .... However, since the current changeover is determined by the counter 39, the changeover is always effected by a deviation of α. Accordingly, the torque of the direct current brushless motor 25 includes a large ripple in the direction BK as indicated by a thick arrow in FIG. 9. The carrier 26 impinges against the stopper 33 in this state, the current ③ is caused to flow in FIG. 9 and rotation of the rotor 9 of the direct current brushless motor 25 is stopped at the position of the maximum torque, that is, at the middle between the points A and B. Accordingly, the mechanical friction can be neglected and positioning can be performed precisely.

When rotor 9 rotates, pulses are output. When carrier 26 abuts against stopper 33, no pulses are output, since rotor 9 does not rotate. Therefore, when counter 39 does not receive pulse signals for a certain amount of time, the value of the counter 39 is reset at n/2, and electric currents are applied in the order of ⊖③→①→②→... to rotate the rotor 9 in the direction FW, so that the starting position of carrier 26 is determined.

In this embodiment of the present invention, rotor 9 is controlled to automatically rotate forwardly and stops at point A′ any time after carrier 26 abuts against stopper 33, and the value of counter 39 is reset at n/2. Such stop point can be chosen from among the stationary points A, B, C, D, E, F and A′ or rotor 9.

Since rotor 9 automatically rotates a certain distance in the direction FW after carrier 26 abuts against stopper 33, as described above, carrier 26 is led and stopped at a certain distance from stopper 33 after it abuts against the stopper 33. In this manner, carrier 26 will repeatedly be led to the same starting position, for example, the left margin in this embodiment.

The phase error α before impingement of the carriage 26 at the stopper 33 is reduced to 0 by setting the value of the counter 39 at n/2 at the time of impingement. The reason is that since the stopper 33 is located at ½ between the points A and B and the value of the counter is 0 at the point A and n at the point B, the ideal value of the counter 39 at the position of ½ between the points A and B is n/2.

By this correction the torque of the direct current brushless motor 25 is converted to an ideal torque indicated by a thick arrow in the direction FW in FIG. 9. Accordingly, a signal forcibly producing the phase ⊖1 is put out from the printer control portion 34 so that the phase is not changed to ⊖2 even if a phase changeover signal is emitted from the counter 39. If this signal is transmitted to the servo control portion 35, the rotor can be stopped at the point A'. Also when the stopper is stopped at the point A', an error of the stop position is similarly generated by the mechanical friction at the time of starting. However, since the starting point in this case is set at the point of impingement of the carrier 26 against the stopper 33 as pointed out hereinbefore, the error of the stop position can be detected by the printer control portion 34 and no trouble takes place.

As is apparent from the foregoing description, according to the present invention, by arranging the stopper at the point of ½ of the stationary point pitch of rotation of the rotor and correcting the count value of the counter by impingement of the carrier against this stopper, the phase adjustment of the direct current brushless motor and setting of the absolute position of the rotor can be accomplished. Accordingly, the carrier can be positioned to the starting position without using starting point detecting elements such as a light emission diode and a photo transistor, which are indispensably used in the conventional methods, and therefore, effects of enhancing the reliability and reducing the cost can be attained.

The present invention can be applied to not only a carriage of a printer as mentioned above but also any other moving body for which movement from the fixed position is required, and the above-mentioned effects can be similarly attained.

What is claimed is:

1. An apparatus for moving a movable body comprising:
   a direct current brushless motor comprising a stator including a plurality of armature coils secured on a stator yoke through a substrate; a disc-like magnet having N and S poles arranged alternately in a circumferential direction to confront the armature coils, and a rotatable rotor having a rim and a speed-detecting slit on the rim;
   means for applying an electric current corresponding to a magnetic pole of the magnet to each armature coil to obtain rotating power for the motor;
   a speed detector responsive to the speed detecting slit of the rotor for generating a frequency voltage pulse proportional to motor speed;
   counter means for counting the frequency pulses from said speed detector;
   means for changing excitation phases after every definite number of pulses counted;
   stopper means for stopping the movable body at a predetermined position at or close to the maximum torque of the motor, whereby impingement of the movable body against the stopper means stops rotation of the rotor;
   means for resetting the counter means to a count number corresponding to said predetermined position; and
   means for rotating the rotor in a reverse direction to locate the rotor at a stable stop position and position the motor at a starting point.

2. In a method of leading a moving body driven by a direct current brushless motor to a starting position comprising moving a movable body with a direct current brushless motor comprising a stator including a plurality of armature coils secured on a stator yoke through a substrate, a disc-like magnet having N and S poles arranged alternately in a circumferential direction to confront the armature coils, and a rotatable rotor having a rim and a speed-detecting slit on the rim,
   applying an electric current corresponding to a magnetic pole of the magnet to each armature coil to obtain rotating power for the motor,
   detecting the speed-detecting slit with and putting out a frequency pulse voltage proportional to speed,
   counting the number of frequency pulses with a counter,
   changing excitation phases after every definite number of pulses counted,
   impinging the moving body against a stopper positioned at a predetermined position at or close to the maximum torque of the motor to stop rotation of the rotor,
   resetting the counter to a count number corresponding to said predetermined position, and
   rotating the rotor in a reverse direction to locate the rotor at a stable stop position and position the motor at the starting point.

3. A method of leading a moving body driven by a direct current brushless motor to a starting position as set forth in claim 2, further including controlling the position of the stopper.

* * * * *